United States Patent
Toshimitsu et al.

[11] 3,919,396
[45] Nov. 11, 1975

[54] PHOSPHORIC ACID PURIFICATION

[75] Inventors: Itaru Toshimitsu; Sakumi Fujii; Taketoshi Nakajima, all of Shin-Nanyo, Japan

[73] Assignee: Toy Soda Manufacturing Co., Ltd., Japan

[22] Filed: Jan. 8, 1974

[21] Appl. No.: 431,761

[30] Foreign Application Priority Data
Jan. 19, 1973  Japan.................. 48-7901

[52] U.S. Cl. .............................................. 423/321
[51] Int. Cl.$^2$ ................................. C01B 25/16
[58] Field of Search ......... 423/319, 320, 321, 321 S

[56] References Cited
UNITED STATES PATENTS

| | | | |
|---|---|---|---|
| 3,497,330 | 2/1970 | Baniel et al. | 423/321 |
| 3,595,613 | 7/1971 | Klingelhoefer | 423/320 |
| 3,607,029 | 9/1971 | Goret et al. | 423/321 |
| 3,684,439 | 8/1972 | Rose et al. | 423/321 |
| 3,723,606 | 3/1953 | Klingelhoefer et al. | 423/321 |

*Primary Examiner*—Oscar R. Vertiz
*Assistant Examiner*—Eugene T. Wheelock
*Attorney, Agent, or Firm*—Oblon, Fisher, Spivak, McClelland & Maier

[57] ABSTRACT

Highly purified phosphoric acid in high yield is obtained by extracting crude phosphoric acid with an organic solvent capable of extracting phosphoric acid in an extraction battery to form an extraction solution of phosphoric acid which is purified by contact with a reflux of an aqueous phosphoric acid solution in a purification battery and the purified extract solution is back-extracted in a washing battery to form a dilute pure phosphoric acid solution wherein the concentration of the phosphoric acid in the reflux is higher than the concentration of phosphoric acid obtained by the back-extraction and is also higher than the concentration of phosphoric acid which is in equilibrium with the phosphoric acid in the extraction solution discharged from the extraction battery.

6 Claims, 1 Drawing Figure

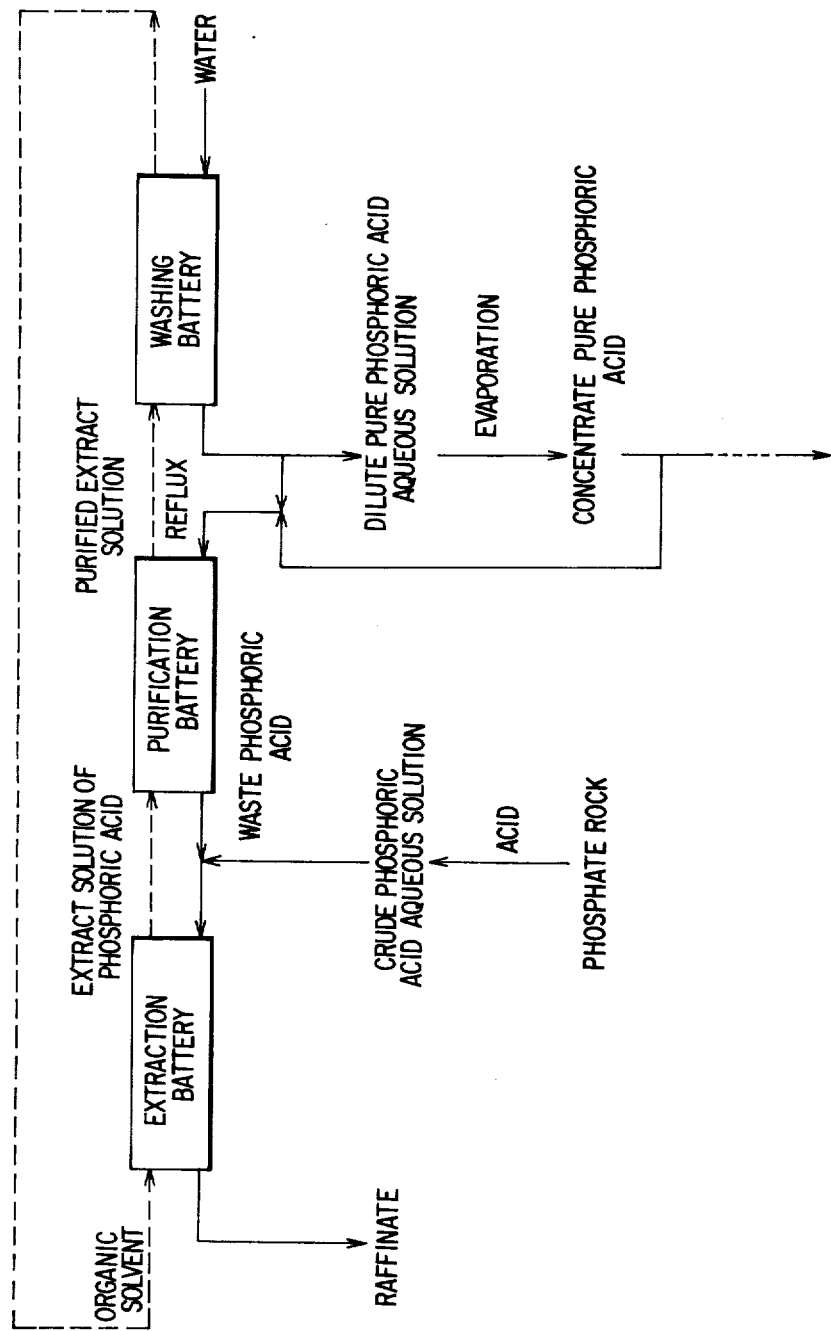

PHOSPHORIC ACID PURIFICATION

BACKGROUND OF THE INVENTION

1. Field of the Invention

This invention relates to a process for purifying a crude aqueous phosphoric acid solution prepared by a wet process from phosphate rock. More particularly, it relates to a process for preparing phosphoric acid in high purity and in high yields by means of an organic solvent extraction from a crude phosphoric acid prepared by a wet process.

2. Description of the Prior Art

Crude phosphoric acid prepared by a wet process by treating a phosphate rock with an acid contains various impurities such as Ca, F, Si, Al, Fe, $SO_4$, As, or the like. Accordingly, the phosphoric acid obtained from the wet process has been primarily used for the preparation of fertilizers since the high purity phosphoric acid used in foods, medicines or the like is not obtainable from the wet process. Phosphoric acid prepared by a dry process has been used in these areas.

Recently, various processes, such as an organic solvent extraction process, an ionexchange process, a crystallization process, or the like, have been proposed for preparing a purified phosphoric acid having high purity similar to the phosphoric acid prepared by a dry process.

One such process employs the purification of phosphoric acid by extracting the phosphoric acid with an organic solvent and back-extracting the phosphoric acid from the extract solution of phosphoric acid by using water as a stripping agent. However, when the crude phosphoric acid prepared by a wet process is contacted with an organic solvent, it is difficult to prevent the simultaneous extraction of various impurities by the solvent with the phosphoric acid. In order to prepare a pure phosphoric acid, it has been proposed to wash the extract solution of phosphoric acid with a small amount of water or a phosphoric acid solution prior to the back-extraction of the phosphoric acid with water.

Conventionally, the purification process comprises the step of extracting phosphoric acid into a solvent phase by contacting the crude phosphoric acid with an organic solvent (hereinafter referred to as the extraction battery); followed by the step of removing impurities in the extracting phase by contacting a small amount of water or a purified phosphoric acid with the extraction phase containing the phosphoric acid from the extraction battery (hereinafter referred to as the purification battery); and then recovering purified phosphoric acid from the extraction phase containing purified phosphoric acid by contacting the extraction phase with water to obtain purified acid from the purification battery (hereinafter referred to as the washing battery).

In general, a vessel type or tower type counter-current continuous multistage extraction battery has been used for the extractions. However, a detailed proposal for the purification battery has not yet been determined.

The purification battery is used for removing the various impurities contained in the phosphoric acid extract solution. A large amount of water or aqueous phosphoric acid solution should be used for preparing a phosphoric acid having high purity.

Also, it is important to selectively extract phosphoric acid in high yield by separating impurities in the extraction battery. However, it is difficult to prevent the co-extraction of certain impurities as stated above. It is of substantial importance to obtain higher yields of phosphoric acid. Accordingly, the waste aqueous phosphoric acid solution containing impurities from the purification battery is recycled to the extraction battery together with the crude phosphoric acid. In this recycling operation, the ratio of organic solvent to phosphoric acid (flow rate of solvent/flow rate of phosphoric acid aqueous solution) is decreased in accordance with an increase in the amount of recycled aqueous phosphoric acid solution to a specific flow rate of the solvent, thereby decreasing the coefficient of extraction of phosphoric acid.

The concentration of the recycled aqueous phosphoric acid solution is usually lower than the concentration of the crude phosphoric acid prepared by the wet process. Accordingly, the concentration of phosphoric acid decreases depending upon the amount of increase in the recycled aqueous phosphoric acid solution thereby the coefficient of extraction of phosphoric acid in the extraction battery is also decreased. That is, an increase of the recycled phosphoric acid aqueous solution causes a decrease in the coefficient of extraction of phosphoric acid in the extraction battery because of the flow rate and the decrease of concentration of phosphoric acid.

In the conventional system which comprises in combination, the extraction battery, the purification battery and the washing battery, increasing the yields of phosphoric acid results in a decrease in the purity of the resulting phosphoric acid for the reasons disclosed above.

These disadvantages have not been overcome by the conventional method of using water or part of the aqueous phosphoric acid solution prepared by back-extracting with water in the washing battery, as a washing solution in the purification battery.

SUMMARY OF THE INVENTION

Accordingly, one object of this invention is to provide a purified phosphoric acid useful in the fields of foods, medicines and pure chemicals.

Another object of this invention is to provide a stable operation of the extraction process to obtain purified phosphoric acid in high yield with a high coefficient of extraction.

Briefly, these and other objects of the invention as herein after will become apparent are achieved by providing a process for the purification of crude phosphoric acid which has been extracted with an organic solvent from a crude phosphoric acid prepared from a phosphate rock with an acid by a wet process wherein the crude phosphoric acid is contacted with an organic solvent capable of extracting phosphoric acid in an extraction battery to form an extract solution of phosphoric acid, which is purified by contacting with a reflux of an aqueous phosphoric acid solution in a purification battery and the purified extract solution is back-extracted in washing battery to form a dilute pure phosphoric acid solution wherein the concentration of phosphoric acid in the reflux is higher than the concentration of phosphoric acid obtained by the back-extraction in the washing battery and is also higher than the concentration of phosphoric acid which is in equilibrium with the extraction solution of phosphoric acid discharged from the extraction battery.

It is preferable to supply a part of the phosphoric acid aqueous solution obtained by back-extraction in the washing battery, from one end of stage of the purification battery and to supply a concentrate phosphoric acid having 30 – 60% (as $P_2O_5$) from an intermediate stage of the purification battery and the waste phosphoric acid aqueous solution discharged from the purification battery is recycled to the extraction battery.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing which schematically represents a continuous recycling purification process of this invention.

DETAILED DESCRIPTION OF THE PREFERRED EMBODIMENTS

Studies were conducted to determine the rates of separation of various impurities in the purification battery of the extraction solution from the extraction battery which contains phosphoric acid and the various impurities which were co-extracted with the phosphoric acid by the organic solvent in the extraction battery. Two classes of impurities were determined and identified as the easily separable impurities and the difficulty separable impurities.

Moreover, it was determined that when the concentration of phosphoric acid increases in the purification battery, the partition coefficient of the easily separable impurities (concentration of impurities in water phase (mg/l) to concentration of impurities in solvent phase (mg/l) decreases however, the impurities are still separable. Also, the partitition coefficient of the difficulty separable impurities slightly decreases with an increase in the concentration of phosphoric acid, however, the separability of the difficulty separable impurities remains substantially the same.

Conventionally, in the purification, a part of the pure dilute aqueous phosphoric acid solution discharged from a washing battery, as it is, is used as an aqueous phosphoric acid solution for stripping impurities in the purification battery. In such a case, the flow rate of the aqueous phosphoric acid solution discharged from the purification battery is greater than or slightly less than or the same as the flow rate of phosphoric acid fed to the purification battery.

Remarkably, however, the flow rate of the aqueous phosphoric acid solution discharged from the purification battery has been reduced to about one-half to one-tenth of the flow rate of the aqueous phosphoric acid solution fed to the purification battery by the process of this invention. The solvent in the purification battery therefore maintains a higher concentration of phosphoric acid than that of the extraction battery and on the other hand, the impurities can be separated by the washing aqueous phosphoric acid solution.

The organic solvent used in this invention is not critical but may be any solvent capable of extracting phosphoric acid from a crude aqueous phosphoric acid solution and which has a limited water solubility, but may be separated from a water phase, and can selectively extract phosphoric acid. Suitable solvents include alkyl derivatives of phosphoric acid such as tributyl phosphate, or the like such as amines, tricaprylyl amine or the like, aliphatic alcohols such as isoamyl alcohol, n-butanol or the like and ketones such as acetone or the like.

The concentration of crude phosphoric acid prepared by a wet process is 20 – 45% by weight $P_2O_5$. The crude phosphoric acid prepared in industry, can be used for the process of this invention as about 25 – 35% by weight $P_2O_5$ of concentration is suitable and the industrial acid has this concentration.

The process of the invention preferably comprises a series of extraction, purification and washing operations comprising an extraction battery, a purification battery, a washing battery (recovering) using continuous counter-current mixer-settlers.

In the extraction battery, a mixture of (a) crude phosphoric acid prepared by a wet process and (b) the waste phosphoric acid containing impurities discharged from the purification battery, is counter-currently contacted with an organic solvent so as to selectively extract phosphoric acid to the solvent phase. Significant amounts of various impurities contained in the crude phosphoric acid are coextracted to the solvent. In order to increase the coefficient of extraction of phosphoric acid, hydrochloric acid can be added with the organic solvent. The extractor used in the invention can be a counter-current multi-stage extractor such as mixer-settlers or extraction towers such as a perforated plates tower or the like. It is usually preferable to use an extractor having 10 – 30 stages. The flow ratio, which is designated as $$\frac{\text{solvent flow rate}}{\text{crude phosphoric acid aq. sol. flow rate} + \text{recycled phosphoric acid aq. sol. flow rate}},$$

is dependent upon the concentration of the crude phosphoric acid, the number of stages of the extractor and may be readily determined but, is usually in a range of from 3 to 10. It is not desirable to increase the flow rate of solvent because of an increase of the flow rate of aqueous phosphoric acid solution in the purification battery and in the relation of the coefficient of separation of impurities. The quantity of hydrochloric acid should be minimized to the amount necessary to provide a desirable coefficient of extraction of the phosphoric acid.

The concentration of phosphoric acid in the extract solution in the extraction battery is in equilibrium with the concentration of phosphoric acid in the aqueous solution in each stage of extraction. The water content of the extract solution is decreased by an effect of the impurities of $Ca^{++}$, $Mg^{++}$, $Na^+$, $Fe^{++}$, $Fe^{+++}$, or the like in the phosphoric acid aqueous solution, in comparison with a water content of the extract solution contacted with pure phosphoric acid aqueous solution. This phenomenon provides the effect of a decrease in phosphoric acid aqueous solution in the purification battery; that is the effect of high concentration of impurities in the aqueous solution.

In the purification battery, the extract solution of phosphoric acid discharged from the extraction battery, is counter-currently contacted with a phosphoric acid aqueous solution having higher concentration of phosphoric acid which contains less impurities (hereinafter referred to as a reflux), so as to strip the various impurities from the extract solution.

The extractor used in the purification battery can be the same as those used in the extraction battery. The number of stages in the extractor is dependent upon the type of solvent, the concentration of crude phosphoric acid and the concentration of impurities and the flow ratio, or the like but is usually in a range of from 5 to 40 stages. The flow ratio (extract solution flow rate to reflux flow rate) is dependent upon the number of stages, the concentration of crude phosphoric acid and can be readily determined but is usually in a range of 30 – 3. The reflux may be prepared as follows.

The concentration of phosphoric acid in the reflux is higher than the concentration of phosphoric acid in the aqueous solution of pure phosphoric acid which is in equilibrium with the concentration of phosphoric acid in the extract solution of phosphoric acid discharged from the extraction battery. It is also higher than the concentration of phosphoric acid in the aqueous phosphoric acid solution prepared by back-extraction with water in the washing battery after purification in the purification battery.

The aqueous phosphoric acid solution which constitutes the reflux may be prepared by mixing a part of the dilute pure phosphoric acid discharged from the washing battery and a part of the concentrated pure phosphoric acid prepared by an evaporation under heating to remove water and volatile impurities from the dilute pure phosphoric acid. It may also be prepared by mixing pure water with a part of the concentrated pure phosphoric acid prepared by evaporation under heating. In the latter case, the quantity of impurities is lower than that in the former case so that the latter is preferred in order to obtain a higher purity of the product. However, a larger evaporator for the concentration is required and accordingly, the former is usually used. It is also possible to use a phosphoric acid containing a small amount of impurities diluted with water. The concentration of the phosphoric acid in the reflux is dependent upon the types of solvents used and the concentration of the crude phosphoric acid, and can be readily determined but is usually in a range of about 250g/l – 500g/l of $H_3PO_4$ when an aliphatic alcohol such as n-butanol or isoamylalcohol is used as the solvent When the concentration of $H_3PO_4$ in the dilute aqueous solution of pure phosphoric acid discharged from the washing battery is lower than the concentration of $H_3PO_4$ in the aqueous solution of pure phosphoric acid which is equilibrium with the concentration of $H_3PO_4$ in the extract solution of phosphoric acid (for example, to provide a high yield of phosphoric acid), the concentration of the reflux is increased to higher than 1.05 times preferably 1.1 – 1.9 times and most preferably 1.1 – 1.5 times (as g/l) the concentration of $H_3PO_4$ in the latter aqueous solution of pure phosphoric acid in the equilibrium.

When the concentration of $H_3PO_4$ in the dilute aqueous solution of pure phosphoric acid discharged from the washing battery is higher than the concentration of $H_3PO_4$ in the aqueous solution of pure phosphoric acid (for example to provide effective recovery with a small amount of water), the concentration of the reflux is increased to higher than 1.05 times preferably 1.1 – 1.9 times and most preferably 1.1 – 1.5 times (as g/l) the concentration of the dilute aqueous solution pure phosphoric acid. It is possible to decrease the flow rate of the aqueous solution of phosphoric acid solution discharaged from the purification battery to 70 – 15% by volume of the flow rate of the aqueous phosphoric acid solution fed into the purification battery, by feeding the reflux with the above high concentration of phosphoric acid. This phenomenon is the result of the remarkable concentration effect at the inlet of the extract solution of phosphoric acid, especially at the end stage of the inlet, because of the above-identified relation between the equilibrium and the concentrations of the impurities. The end stage of the inlet of the phosphoric acid extract solution is preferably used as a concentration stage rather than as a purification stage.

The waste phosphoric acid aqueous solution discharged from the purification battery can be recycled to the extraction battery. In some cases the waste solution can be used for a fertilizer after recovering the solvent from it, however this is not usually done.

As already discussed, as the concentration of phosphoric acid increased, the partition coefficient of impurities decreases and therefore it would be expected to be a disadvantage to increase the concentration of $H_3PO_4$ in the aqueous phosphoric acid in the purification battery. Quite unexpectedly however, when practicing this invention a remarkable effect results from increasing the concentration of $H_3PO_4$ in that the partition coefficients of $Ca^{++}$, $Fe^{+++}$, or the like are quite high, and even though the partition coefficients of impurities decrease by an increase of the concentration of $H_3PO_4$ the level of the partition coefficients of impurities are still high enough to separate the impurities.

On the other hand, the partition coefficients of Si, F, Al, As, or the like are not as greatly decreased by an increase in the concentration of $H_3PO_4$. Accordingly, a higher purification effect can be obtained by decreasing the flow ratio even though the concentration of $H_3PO_4$ is increased. For example, when the concentration of $H_3PO_4$ of the aqueous solution of phosphoric acid used for the purification is selected to be in equilibrium with the concentration of $H_3PO_4$ of the extract solution, the quantity of the aqueous solution of phosphoric acid used for the purification should be decreased to one-half to one-tenth compared to that of present invention in the case for the same yield of pure phosphoric acid. Accordingly, the purity of the resulting phosphoric acid decreases.

That is, in order to accomplish the same purification effect in the purification battery, it is necessary to use 1.5 – 6 times by volume of aqueous phosphoric acid solution compared with that of the present invention, whereby the quantity of the aqueous solution of phosphoric acid discharged from the purification battery increases so as to decrease the yield of phosphoric acid in the extraction battery to about 70 – 50% of the yield of phosphoric acid in the present invention.

In order to accomplish the effect of a decrease in the quantity of the aqueous solution of phosphoric acid in the purification battery, a pure concentrated phosphoric acid may be added to the purification battery at an intermediate stage. That is, a part of the pure dilute aqueous solution of phosphoric acid discharged from the washing battery is fed to one end of the purification battery as a reflux and a pure concentrated phosphoric acid is fed to an intermediate stage of the purification battery. The concentration of phosphoric acid of the concentrated phosphoric acid may be more than about 30% preferably from 45 – 60% as $P_2O_5$. The quantity of concentrated phosphoric acid added is determined to provide 1.1 – 1.9 times the concentration of $H_3PO_4$, as g/l, the concentrated phosphoric acid to the dilute phosphoric acid aqueous solution of the reflux.

The stage of inlet of the concentrated phosphoric acid may be any intermediate stage in the purification battery. The concentrated phosphoric acid can contain impurities when it is introduced near the inlet of the extract solution.

In the washing battery (recovering battery), the purified phosphoric acid extract solution is counter-currenlty contacted with pure water to back-extract pure phosphoric acid as a dilute aqueous solution. The washing battery usually contains from 7 to 15 stages. The water saturated solvent from which phosphoric acid is extracted preferably contains substantially no phosphoric acid and if desired, the solvent can be recycled to the extraction battery. Also a portion of the dilute pure phosphoric acid aqueous solution may be used as part of the reflux for the purification in the purification battery, and the remainder may be concentrated by evaporation so as to yield a concentrated phosphoric acid. This reaction system is illustrated in the FIGURE.

The temperature in the extract-purification employing the three batteries must be lower than the boiling point of the extract solution and of the phosphoric acid aqueous solution, and is usually room temperature.

In the continuous extract-purification, higher effect can be imparted by the following operation since a fluctuation of the flow rate of each of the solutions and liquids cannot be prevented and a fluctuation in the concentration of the crude phosphoric acid prepared by a wet process also cannot be prevented in an industrial operation. However, the effect of the fluctuations of the flow rate and the concentration can be negated by controlling the concentration of phosphoric acid of the reflux, so as to obtain phosphoric acid having high purity in a high yield by a stable operation.

Having generally described this invention, a further understanding can be obtained by reference to certain specific examples, which are included for purposes of illustration only and are not intended to be limiting unless otherwise specified.

EXAMPLE I

A crude phosphoric acid which was prepared by treating a phosphate rock with sulfuric acid in a wet process and having the following components was used.

| $P_2O_5$ | 33% |
|---|---|
| Ca | 2000 ppm |
| Fe | 1680 ppm |
| Al | 1900 ppm |
| Si | 8500 ppm |
| F | 25400 ppm |
| $SO_4$ | 9500 ppm |

The crude phosphoric acid was fed at a rate of 320 ml/hour to one end of an 18 stage continuous counter-current mixer-settler of the extraction battery along with a waste aqueous solution of phosphoric acid at a rate of 140 ml/hour discharged from the purification battery. Isoamyl alcohol saturated with water was fed at a rate of 3000 ml/hour, and 35% hydrochloric acid was also fed at a rate of 50 ml/hour to the other end of the extraction battery.

All of the extract solution of phosphoric acid discharged from the extraction battery was fed to one end of an 11 stage continuous counter-current mixer-settler of the purification battery. A dilute purified phosphoric acid aqueous solution ($P_2O_5$ 19.5%) discharged from the washing battery was fed at a rate of 310 ml/hour and a concentrated phosphoric acid ($P_2O_5$ 54.3%) was fed at a rate of 40 ml/hour, as a reflux, by mixing them, to the other end of the purification battery so as to strip the impurities in the solvent phase.

The resulting extract solution of a purified phosphoric acid discharged from the purification battery was fed to one end of the 10 stage continuous counter-current mix-settlers of the washing battery and water was fed to the other end of the washing battery, whereby phosphoric acid was transferred to the aqueous phase so as to discharge a dilute purified phosphoric acid ($P_2O_5$ 19.5%) at a rate of 1080 ml/hour. The dilute purified phosphoric acid was fed at a rate of 310 ml/hour to the purification battery. This reaction scheme is illustrated schematically in the Figure. A continuous operation was performed to the equilibrium condition. As the result, the amount of the waste phosphoric acid aqueous solution discharged from the purification battery decreases to 140 ml/hour, and the phosphoric acid was recycled to the extraction battery. A yield of phosphoric acid 96.1% was obtained. The components of the dilute purified phosphoric acid obtained in the washing battery, are as follows:

| $P_2O_5$ | 19.5% |
|---|---|
| Ca | 2.0 ppm |
| Fe | 1.2 ppm |
| Al | 1.5 ppm |
| Si | 1400 ppm |
| F | 4300 ppm |
| $SO_4$ | 1100 ppm |

Reference

The same apparatus and procedure as used in Example I was followed except that no concentrated phoshoric acid was added. Instead a dilute purified phosphoric acid solution was fed as the reflux at a rate of 350 ml/hour. As a result, the purity of the purified phosphoric acid was substantially the same as that of Example I. However, the waste phosphoric acid discharged increased to 380 ml/hour and the yield of phosphoric acid decreased to 72.1%.

EXAMPLE II

A crude phosphoric acid prepared by the wet process by treating a phosphate rock with sulfuric acid, was mixed with a calcium compound to obtain the crude phosphoric acid having the following formula

| $P_2O_5$ | 26.9% |
|---|---|
| Fe | 1200 ppm |
| Al | 2100 ppm |
| Ca | 74000 ppm |
| $SO_4$ | 2300 ppm |
| Si | 7900 ppm |
| F | 24300 ppm |

The crude phosphoric acid was fed at a rate of 202 ml/hour and the waste phosphoric acid aqueous solution from the purification battery was fed at a rate of 71 ml/hour to one end of the 16 stage continuous counter-current mixer-settlers of the extraction battery. n-Butanol saturated with water was fed at a rate of 1420 ml/hour and 35% hydrochloric acid was fed at a rate of 59 m/l hour to the other end of the extraction battery to extract phosphoric acid.

The extract solution of phosphoric acid discharged from the extraction battery was fed to one end of 12 stage continuous counter-current mixer-settlers of the purification battery. A part of the dilute purified phosphoric acid discharged from the washing battery was fed at a rate of 160 ml/hour and a concentrated purified phosphoric acid ($P_2O_5$ 54.3%) was fed at a rate of 40 ml/hour to the other end of the purification battery in a mixed condition so as to strip impurities in the solvent phase. The extract solution of purified phosphoric acid discharged from the purification battery was fed to one end of a 10 stage continuous counter mixer-settlers of the washing battery, and water saturated with n-butanol was fed at a rate of 368 ml/hour to the other end of the washing battery, whereby the phosphoric acid in the solvent was stripped. The waste phosphoric acid aqueous solution discharged from the purification battery, was recycled to the extraction battery.

A continuous operation was performed to the equilibrium condition. As the result, the amount of the waste aqueous solution of phosphoric acid discharged from the purification battery decreased to 71 ml/hour. The yield of purified phosphoric acid was 96.4%.

The resulting dilute purified phosphoric acid had the formula shown in Table 1, and it was concentrated to prepare a concentrate phosphoric acid having the formula shown in Table 2.

TABLE 1

| | |
|---|---|
| $P_2O_5$ | 21.4% |
| Fe | <1 ppm |
| Al | 1 ppm |
| Ca | 2 ppm |
| $SO_4$ | 250 ppm |
| Si | 1300 ppm |
| F | 3800 ppm |

TABLE 2

| | |
|---|---|
| $P_2O_5$ | 54.3% |
| Fe | 3 ppm |
| Al | 4 ppm |
| Ca | 8 ppm |
| $SO_4$ | 1000 ppm |
| Si | 30 ppm |
| F | 150 ppm |

Reference 2

A part of the dilute purified phosphoric acid aqueous solution prepared by the operation and the apparatus of Example II was fed at a rate of 203 ml/hour, as the reflux to the purification battery except that no concentrated purified aqueous solution of phosphoric acid was added to the reflux. As the result, the waste aqueous solution of phosphoric acid discharged from the purification battery increased to a rate of 181 ml/hour as compared with Example II whereby the yield of phosphoric acid decreased to 74.2%. The purity of the purified phosphoric acid was similar to that of Example II.

Reference 3

A part of the dilute purified phosphoric acid aqueous solution prepared by the operation and the apparatus of Example II was fed at a rate of 93 ml/hour as the reflux to the purification battery except that no concentrated purified aqueous phosphoric acid solution was added to the reflux. Although the yield of phosphoric acid was 94.3%, the purity of the phosphoric acid was quite low as follows.

| | |
|---|---|
| $P_2O_5$ | 20.5% |
| Fe | 6 ppm |
| Al | 9 ppm |

-continued

| | |
|---|---|
| Ca | 8 ppm |
| $SO_4$ | 620 ppm |
| Si | 2500 ppm |
| F | 5100 ppm |

EXAMPLE III

A concentrated purified phosphoric acid ($P_2O_5$ 54%) prepared by the operation and the apparatus of Example II, was fed at a rate of 40 ml/hour, without mixing with the dilute phosphoric acid fed to the purification battery, to sixth stage of the purification battery from the inlet of the extract solution of phosphoric acid.

The yield and the purity were substantially the same as those of Example II.

EXAMPLE IV

The process of Example III was followed except that the solvent was a mixture of isoamyl alcohol and n-butanol of 1; 1.

The yield and the purity were substantially same with those of Example III.

EXAMPLE V

All of the dilute purified aqueous phosphoric acid solution discharged from the washing battery in accordance with Example II was concentrated to obtain a concentrated phosphoric acid solution ($P_2O_5$ 54.3%). A part of the concentrate phosphoric acid was diluted with water to form a phosphoric acid aqueous solution ($H_3PO_4$ 380 g/l) having 1.45 times concentration of the dilute purified phosphoric acid ($H_3PO_4$ 260 g/l), and this was used as the reflux in the process of Example II. The yield and the purity were substantially the same as those of Example II.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. In a process for the extraction and purification of impure wet process phosphoric acid comprising:
    a. extracting said impure wet process phosphoric acid by countercurrently contacting said acid with a liquid organic solvent so as to form an impure extract solution of phosphoric acid,
    b. purifying said impure extract solution of phosphoric acid by countercurrently contacting said solution with a reflux solution of a pure dilute aqueous solution of phosphoric acid so as to form purified acid extract solution and a waste aqueous phosphoric acid solution,
    c. washing said purified acid extract solution by countercurrently contacting said solution with pure water so as to form a pure dilute aqueous solution of phosphoric acid,
    d. concentrating at least a part of the dilute aqueous solution of phosphoric acid of step (c) by evaporation to remove water and to form a concentrated aqueous phosphoric acid solution product,
    e. recycling the remainder of the pure dilute aqueous solution of phosphoric acid formed in step (c) to step (b) as said reflux solution, the improvement comprising recycling part of said concentrated aqueous phosphoric acid of step (d) to step (b) so as to form a reflux solution having a higher concentration of phosphoric acid than that of said impure extract solution formed in step (a), and than that of said pure dilute aqueous solution formed in step (c).

2. The process of claim 1, wherein the concentration of phosphoric acid in the reflux solution is higher than 1.05 times (g/l) that of the concentration of phosphoric acid in the dilute pure aqueous solution of phosphoric acid obtained in step (c).

3. The process of claim 1, wherein the concentration of phosphoric acid in the reflux solution is 1.1 – 1.5 times (g/l) that of the concentration of phosphoric acid in the dilute aqueous solution of phosphoric acid obtained in step (c).

4. The process of claim 1, wherein counter-current multistage extractors are used for each of steps (a), (b), and (c).

5. The process of claim 4, wherein the dilute aqueous solution of phosphoric acid is fed to one end stage of the multistage extractor of step (b) and the concentrated aqueous phosphoric acid solution is fed to an intermediate stage of the multistage extractor of step (b).

6. The process of claim 1, wherein the waste aqueous phosphoric acid solution discharged from step (b) is recycled to step (a).

* * * * *

UNITED STATES PATENT AND TRADEMARK OFFICE
CERTIFICATE OF CORRECTION

PATENT NO. : 3,919,396
DATED : November 11, 1975
INVENTOR(S) : Itaru Toshimitsu, Sakumi Fujii, and Taketoshi Nakajima It is certified that error appears in the above-identified patent and that said Letters Patent are hereby corrected as shown below:

Change Assignee from "Toy Soda Manufacturing Co., Ltd." to --Toyo Soda Manufacturing Co., Ltd.--.

Signed and Sealed this sixteenth Day of March 1976

[SEAL]

Attest:

RUTH C. MASON
*Attesting Officer*

C. MARSHALL DANN
*Commissioner of Patents and Trademarks*